Feb. 19, 1935.　　　K. A. SAWIN　　　1,991,467

FILM SOCKET FILLER

Filed Sept. 22, 1933

Inventor.
Kenneth A. Sawin
by Heard Smith & Tennant.
Attys.

Patented Feb. 19, 1935

1,991,467

UNITED STATES PATENT OFFICE 1,991,467

FILM SOCKET FILLER

Kenneth A. Sawin, Cambridge, Mass., assignor to Wheeler Reflector Company, Boston, Mass., a corporation of Massachusetts Application September 22, 1933, Serial No. 690,581

4 Claims. (Cl. 29—84)

This invention relates to a film socket filler of the type illustrated in U. S. Patent No. 1,885,684, November 1, 1932. The device shown in said patent is for the purpose of inserting films between the bayonet blades of a socket receptacle such as is used in series lighting systems, and is formed with a body adapted to be placed between the separated portions of the bayonet blades and provided with a film-delivery passage, a magazine to contain a stack of films which are delivered singly to said passage, and means to eject a film from the passage and introduce it between the bayonet blades.

The magazine constitutes the handle by which the device is held while it is being operated, and said magazine is loaded by removing a cap at the outer end thereof and the spring which is attached to the cap and then introducing the fillers into the magazine through the open end thereof. This filling of the magazine often has to be done by the lineman on the job and under these circumstances it frequently happens that when the films are introduced into the open end of the handle they turn into an edgewise position with respect to the length of the magazine and become wedged in place so that it is difficult to bring them into their correct position transversely of the magazine handle. Moreover, some films are constructed so that the opposite sides thereof have different shapes and when such films are used the device operates best when all the films in the magazine are faced the same way.

In loading the magazine with such films by hand it is not always easy to give the films the correct position in the magazine.

The present improvement relates particularly to the magazine portion of a film socket filler such as described in the above-mentioned patent and it has for its object to provide an improved construction which facilitates loading of the magazine with films and which enables a workman on the job to quickly and properly reload the magazine whenever it has been emptied.

This object is secured by employing a film holder which is separate from the handle and which is insertable thereinto and removable therefrom. The film holder is constructed so that it can be loaded with films at the factory or at some place where suitable machinery may be employed for correctly and accurately placing the films in the holder, and it is also constructed so that when it has been loaded the films are locked therein so that the loaded holder can be readily transported without danger of losing any films therefrom or causing any displacement of the films therein.

The loading of the magazine involves simply the operation of inserting a loaded holder into the magazine and this can be easily done by an operator while working on a job.

In order to give an understanding of the invention I have illustrated in the drawing a selected embodiment thereof which will now be described after which the novel features will be pointed out in the appended claims.

Figure 1:
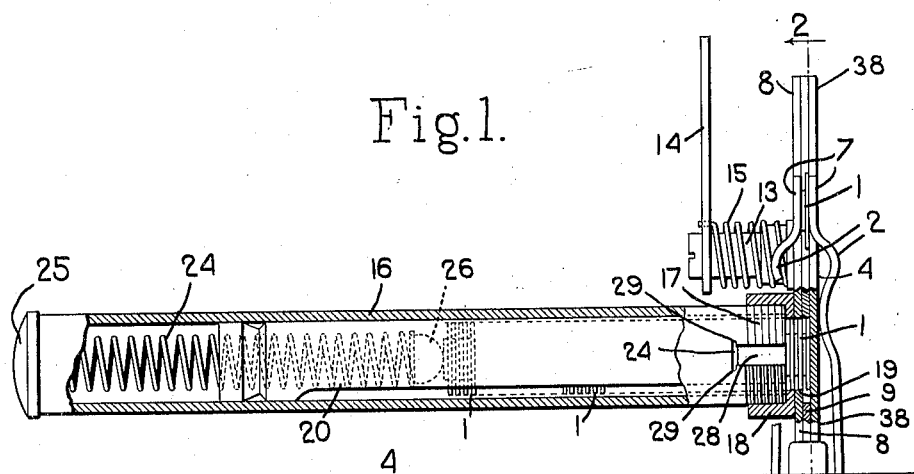
Fig. 1 is a side view with parts broken out of a device embodying my invention and illustrating it in use.

As stated above the present invention is an improvement on the film socket filler illustrated in Patent No. 1,885,684, November 1, 1932 and is designed to insert a so-called insulating film 1 between the two contact blades 2 of a socket receptacle 3. Socket receptacles of this type are commonly used in electric lighting fixtures employing series receptacle heads, the socket receptacle 3 constituting a receptacle or socket to receive the lamp.

These insulating films 1 sometimes break down and when this happens it is necessary to remove the ruptured film and insert a new one, and as indicated above the device of this application is intended for this purpose.

My improved film socket filler is similar to that illustrated in the above-mentioned Patent No. 1,885,684 in that it comprises a body portion indicated generally at 4, which is adapted to be introduced between the spaced portions of the bayonet contacts 2 and which has a film-delivery passage 5. When the body portion is thus placed between the bayonet contacts 2 the discharge end 6 of the film-delivery passage 5 will be situated adjacent the end portions 7 of the bayonet contacts between which the film 1 is to be introduced.

The device also comprises means for feeding films separately into the passage 5 and means to eject each film from the passage 5 and force it between the ends 7 of the bayonet contacts. The body portion is formed with the two side plates 8, 38 and the intermediate spacing member 9, these three elements being secured together in any suitable way as by means of rivets or screws 10.

The intermediate spacing member 9 has a skeleton structure and located within this skeleton spacing member 9 and between the side plates 8, 38 is a film ejector 11 which operates to eject the films individually from the passage 5. This film ejector 11 is in the form of a plate which is fast on a shaft 12, one end of which is journalled in the plate 38 and the other end of which is journalled in a bushing or sleeve 13 rigid with the side plate 8. This shaft 12 is provided with a finger piece 14 by which it may be turned to perform the film-ejecting operation.

Figure 2:
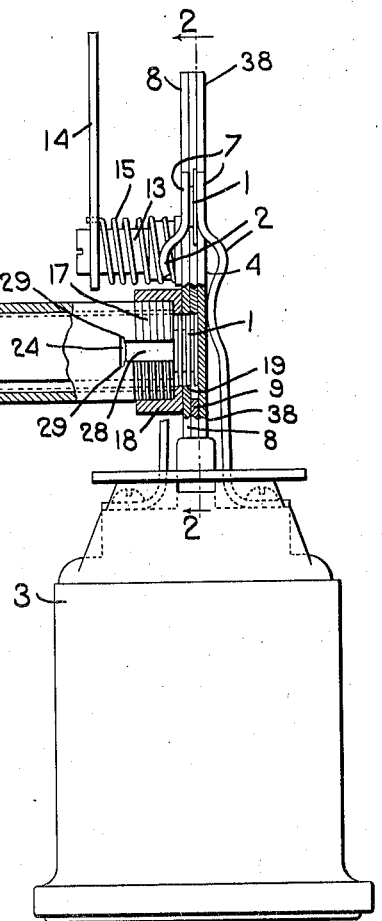
Fig. 2 is a view on the line 2—2, Fig. 1.
Figure 2:
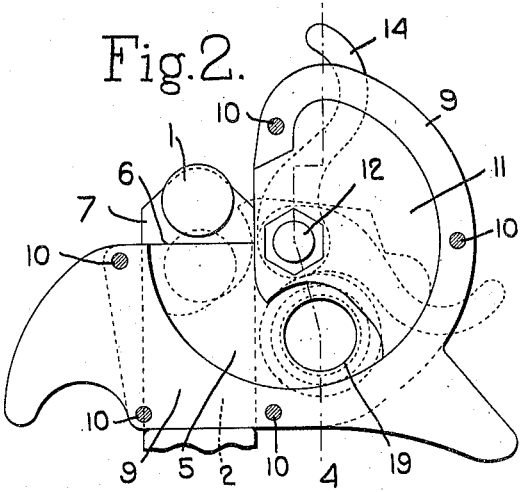

15 indicates a spring which surrounds the hub or sleeve 13 and which is anchored at one end to the sleeve 13 and at the other end to the finger piece 14, said spring normally tending to hold the ejector in its inoperative position shown in full lines, Fig. 2.

16 indicates a handle by which the device is held while it is being manipulated. This handle also constitutes the magazine for containing the stack of films as in said above-mentioned Patent No. 1,885,684.

The handle 16 is in the form of a tube which is provided at one end with exterior screw threads 17 adapted to screw into interior screw threads formed in a boss 18 to which the handle member 16 is secured.

The wall of the side plate 8 is formed with an opening 19 in line with the handle 16 and through which the films are delivered to the passage 5.

The parts thus far described, with the exception of the magazine portion of the device, have, in general, the same construction and operation as similar parts in the above-mentioned patent.

In said patent the stack of films are loaded directly into the handle portion of the device and the latter is provided with a spring which applies a spring pressure against the stack of films and tends to urge them forwardly toward the body portion, said spring operating to feed the films into the delivery passage as needed.

In order to load the magazine handle of the device shown in the above-mentioned patent the cap at the end of the handle and the spring and follower attached thereto is removed and then the films are inserted into the open end of the handle and after a required number of films have been placed in the magazine the cap with the spring attached thereto is replaced on the handle, the spring and follower bearing against the stack of films.

It is frequently necessary to load the magazine while it is being used on a job and in thus loading the magazine by hand the films sometimes drop into the magazine in an edgewise position and become wedged in the magazine.

In accordance with the present invention the films are loaded in the first instance into a film holder which is separate from the handle and from the spring therein and which can be readily inserted into the handle.

The film holder is shown at 20 and it has a tubular shape with an interior diameter corresponding to the diameter of the films 1. This holder 20 is open at one end 21 to permit the films 1 to be loaded thereinto through said end and at the other end 42 said holder is provided with an interior shoulder 22 which may conveniently be produced by forming the tube 20 with a neck portion or portion of reduced diameter, said interior shoulder retaining the films in the holder and preventing them from being discharged therefrom at the end 42. A removable retaining device 23 is employed for holding the films within the holder 20 and preventing them from being discharged through the open end 21 while the holder is being manipulated and inserted in the handle 16. Any suitable retaining device may be employed but I have herein shown one in the form of a spring clip which has a general U-shape and which is inserted through slots 24, 25, formed in the tubular holder 20 adjacent the open end 21. This retaining device is removed when the holder is to be loaded with films 1, the loading being done by inserting the films through the open end 21. This operation of loading the holder may be done by hand or by any suitable machine or appliance which will accurately and rapidly place the films in the holder.

The holder is shown as having an opening 38 in one side through which the films may be seen. The films which are used are sometimes constructed so that the opposed faces have different shapes as illustrated in the drawing and when such films are used it is desirable that they should be so placed in the holder that all the films will face the same way. The ability to load the holder at the factory or by means of a machine ensures this result.

Figure 3:
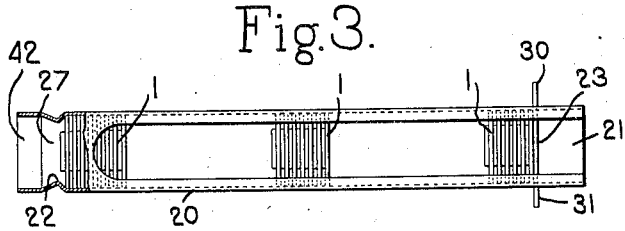
Fig. 3 is a view of the film holder or cartridge with the left hand end broken out.
Figure 4:
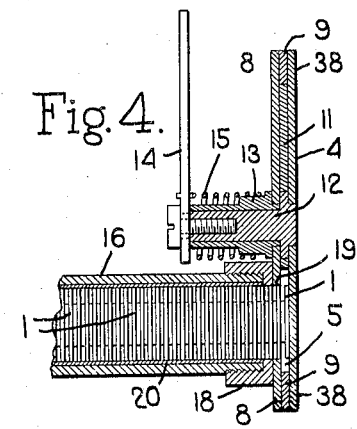
Fig. 4 is a section on the line 4—4, Fig. 2.
Figure 6:
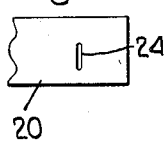
Fig. 6 is a view of one end of the film holder.

After the holder 20 is fully loaded then the retaining clip 23 is inserted through the slots 24, 25 as shown in Fig. 3 thereby to retain the films in the holder. This clip prevents the films from being discharged through the open end 21 and the shoulder 22 prevents the films from being discharged through the opposite end 42.

When the holder or cartridge 20 has been thus loaded with films 1 it is ready to be placed in the magazine handle 16 whenever it is necessary to reload the handle. To do this said handle is unscrewed from the boss 18 and the loaded holder 20 is inserted into the open end of the handle 16. Situated within the handle 16 is a spring 24, one end of which engages the cap 25 which is preferably removably secured to the end of the handle 16, and the other end of which engages a follower 26. The follower and the spring are of a size to pass freely through the throat 27 formed by the interior shoulder 22 and when the loaded holder 20 is inserted into the open end of the handle 16 the end film 1 which is in engagement with the shoulder 22 will be brought into engagement with the follower and the spring 24 will be compressed.

The handle 16 is provided with two opposed slots 28 which extend from the end of the handle to a point somewhat beyond the screw-threaded portion 17 thereof and the inner end of each slot is widened slightly so as to provide the two notches 29.

Figure 5:
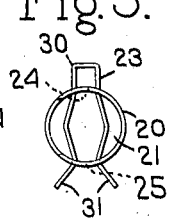
Fig. 5 is an end view of Fig. 3.
Figure 7:
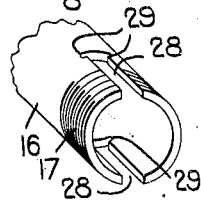
Fig. 7 is a perspective view of one end of the tubular handle 16.

The U-shaped retaining member 23 extends beyond the holder 20 as shown in Figs. 3 and 5 and when the loaded cartridge or holder 20 is inserted into the handle 16 the projecting portions 30, 31 of the retaining member 23 enter the slots 28. The U-shaped retaining member 23 is preferably made resilient and in order to permit it to enter the slots 28 the two legs of said member are forced toward each other slightly. When the loaded cartridge 20 has been inserted into the handle 16 a sufficient distance so that the projecting portions 30 and 31 of the retaining member 23 engage the end of the slots 28, the resiliency of the legs of the member 23 will cause them to separate slightly from each other and snap into the notches 29. In this way the retaining member serves to lock the loaded holder 20 in the handle 16. After a loaded cartridge 20 has been thus placed and locked in the handle 16, then the handle can be screw threaded to the boss 18 and since the slots 28 are longer than the depth of the boss the projecting portions of the retaining member 23 will not interfere with attaching the handle 16 to the boss 18. After the handle has been thus secured to the boss the retaining member 23 may be withdrawn and as soon as this is done the expansive action of the spring 24 will force the stack of films forward in the holder 20 thereby delivering the end film through the opening 19 into the film-delivery passage 5.

With this invention the filling of the magazine with films is facilitated because the loading of the holder 20 involves merely depositing a sufficient number of individual films into the open end of the holder and this is a simple operation since it is done when the holder is removed from the handle 16. After the cartridge or holder 20 has been loaded and the films have been locked therein by the retaining member 23 the insertion of the loaded cartridge or holder into the handle 16 and locking it therein involves simply one operation. After this loaded holder has been thus inserted in the handle the latter can be manipulated and attached to the body portion without paying any attention to the films since they are locked in the holder 20 and the latter is locked in the handle 16 by the retaining member 23.

The use of this invention makes it possible for a workman to carry with him a plurality of loaded cartridges or holders so that when he is out on a job and it becomes necessary to reload the magazine the operation can be accomplished simply by unscrewing the handle from the body portion, removing the empty holder and inserting into the handle a filled holder as above described. The implement is used for introducing films between the bayonet contacts in the same manner as described in said patent, that is, the operator holds the implement by the handle 16 and places the body portion 4 in position between the bayonet contacts 2 as shown in Fig. 1 and then he actuates the finger piece 14 swinging it from the full to the dotted line position in Fig. 2. This operation carries the ejector 11 from its full to the dotted line position and thus operates to eject a film through the passage 5 into position between the ends 7 of the bayonet contacts. When the pressure on the finger piece 14 is released the spring 15 returns the ejector and finger piece to the full line position Fig. 2 thereby uncovering the opening 19. The spring 24 then forces the stack of films forward to deliver the end films through the opening 19 into the passage 5 and in position to be ejected therefrom by the next actuation of the ejector 11.

I claim.

1. A film socket filler comprising a body having a film-delivery passage, a handle connected to the body and having a film-receiving chamber communicating with the passage, a tubular film holder separate from the handle and insertable thereinto and removable therefrom, said holder adapted to hold a plurality of films, a removable retainer to retain the films in the holder, a spring in the handle acting against the films in the holder to feed the films to said passage when the retainer is removed, said retainer when in place having an interlocking engagement with the handle to lock the holder therein.

2. A film socket filler comprising a body having a film-delivery passage, a handle having its inner end detachably connected to the body and also having a film-receiving chamber which communicates with said passage when the handle is secured to the body, a film holder separate from the handle and insertable into said chamber and removable therefrom through the inner end of the handle when it is detached from the body, said holder being open at both ends and adapted to hold a plurality of films, a spring in the handle which extends through one open end of the holder and acts against the films therein to feed them from the holder to the passage, and means to enject the films singly from the passage.

3. A film socket filler comprising a body having a film-delivery passage, a handle having its inner end detachably connected to the body and also having a film-receiving chamber which communicates with said passage when the handle is secured to the body, a film holder separate from the handle and insertable into said chamber and removable therefrom through the inner end of the handle when it is detached from the body, said holder being open at both ends and having an interior shoulder adjacent its outer end and adapted to hold a plurality of films, a spring in the handle extending through the outer end of the holder and acting against the films to feed them to said passage, and means to eject the films singly from the passage.

4. A film socket filler comprising a body having a film-delivery passage, a handle having its inner end detachably connected to the body and also having a film-receiving chamber which communicates with said passage when the handle is secured to the body, a tubular film holder separate from the handle and insertable into said chamber and removable therefrom through the inner end of the handle when it is detached from the body, said holder having an interior shoulder at its outer end and adapted to hold a plurality of films, a spring in the handle acting on the films in the holder through the outer end thereof and feeding them to the passage, and a removable retainer carried by the inner end of the holder and serving to retain the films therein.

KENNETH A. SAWIN.